United States Patent Office 3,351,456
Patented Nov. 7, 1967

---

3,351,456
METHOD OF DESTROYING UNDESIRED PLANT GROWTH
Harmannus Koopman and Jasper Daams, Van Houtenlaan, Weesp, Netherlands, assignors to North American Philips Company, Inc., New York, N.Y., a corporation of Delaware
No Drawing. Original application Sept. 12, 1963, Ser. No. 308,363. Divided and this application Oct. 14, 1965, Ser. No. 511,009
5 Claims. (Cl. 71—86)

ABSTRACT OF THE DISCLOSURE

Use of pentachloro-alkylaminocyclotriphosphazatrienes as herbicides. Examples are pentachloroethylaminocyclotriphosphazatriene and pentachloro-isopropylcyclotriphosphazatriene. This abstract is not intended to be a description of the invention defined by the claims.

---

This application is a division of application Ser. No. 308,363, filed Sept. 12, 1963, now abandoned.

The invention relates to new pentachloro-alkylaminocyclophosphazatrienes of the formula

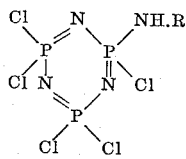

where R represents an aliphatic hydrocarbon radical containing from 1 to 8 carbon atoms.

These new cyclotriphosphazatriene derivatives were found to have a strong phytotoxic activity and to distinguish themselves from known phytotoxic compounds by a number of specific activities.

Hence these new derivatives are highly suitable for use as the active ingredient in a composition for combating undesirable plant growth.

Compounds according to the formula in which R represents an aliphatic hydrocarbon radical containing from 1 to 4 carbon atoms and especially those in which R represents an ethyl radical have an especially strong phytotoxic activity.

The compounds in accordance with the invention are new. They may be produced in a manner known for such compounds or an analogous manner. The production may be effected, for example, by reacting hexachlorocyclotriphosphazatriene with a primary aliphatic amine having a hydrocarbon radical containing from 1 to 8 carbon atoms at a low or the usual temperature. The production is advantageously effected in the presence of a solvent.

The production will now be described more fully with reference to the following examples.

EXAMPLE 1

*Pentachloro-ethylamino-cyclotriphosphazatriene*

94 cc. of an aqueous solution containing 6.0 mol of ethylamine per litre were added with stirring to a solution of 104 g. of hexachlorocyclotriphosphazatriene in 750 cc. of ether in 30 minutes. After the addition, stirring of the reaction mixture was continued for 25 minutes. The ethereal layer was then separated off, dried over sodium sulphate and concentrated by evaporation. The residue was dissolved in isopropanol. The resulting solution was treated with activated carbon and then filtered. The filtrate was concentrated by evaporation until about 30 cc. of solvent were left. When the concentrate was cooled to −25° C. crystallisation occurred. The crystalline product was drawn off and dried. Melting point from 33 to 34° C.

A small amount of the product was obtained from the mother liquor by fractional distillation in a vacuum. Boiling point at a pressure of 15 mms. of mercury from 170–172° C. Total yield: 62.8 g. (59% of the theoretical yield).

EXAMPLE 2

*Pentachloro-butylamino-cyclotriphosphazatriene*

A solution of 8.8 g. of n-butylamine in 30 cc. of benzene was gradually added with stirring to a solution of 21 g. of hexachlorocyclotriphosphazatriene in 100 cc. of benzene. After the reaction mixture had been allowed to stand at room temperature for 20 hours, the precipitated hydrochloric-acid salt of n-butylamine was drawn off. The filtrate was concentrated by evaporation and the resulting residue was crystallised from 7.5 cc. of petroleum ether (boiling range from 40–60° C). When the solution was cooled to −25° C., crystallisation occurred. The separated crystals were filtered off, washed with cold petroleum ether and dried. The mother liquor was concentrated by evaporation and distilled by fractional distillation in a vacuum. Boiling point at 0.1 mm. of mercury pressure from 109 to 111° C. Yield 12 g. (52% of the theoretical yield).

Similarly, other compounds in accordance with the invention were produced, for example:

pentachloro-n-propyl-cyclotriphosphazatriene,
pentachloro-isopropyl-cyclotriphosphazatriene, and
pentachloro-2-ethylhexyl-cyclotriphosphazatriene.

Compounds in accordance with the invention were tested on many weeds, such as black bind weed, sheep's sorrel, wild mustard, corn spurry, wild oats and cleavers. They proved highly active against weeds. Especially the activity against cleavers was conspicuous, which weed is substantially uncontrollable with the aid of known herbicides.

The influence of pentachloro-butylaminocyclotriphosphatriene on the growth of cleavers was investigated by the following tests.

The earth of a number of pots each containing approximately 15 young plants of cleavers was sprinkled with a suspension of the test compound in water in quantities of 1, 3, 10 and 30 mgs. per pot, which corresponds to dosages of 1.6, 4.6, 16 and 48 kg. of the compound per hectare. After ten days the plants were assessed. The results are listed in the table.

| Assessment of the growth of plants: | Dosage of test compound in mg. per pot |
|---|---|
| Killed | 30 |
| Killed | 10 |
| High mortality | 3 |
| Retarded | 1 |

By reason of their activity against many weeds the compounds are particularly suitable as active ingredients in herbicides.

It has further been found that the compounds cause little or no retardation of the germination of seeds. Hence the said compositions are particularly suitable for pre-emergence use in agriculture.

The compositions are also very suitable for the so-called burning of the leaves of beans, peas and potatoes before harvesting.

The compositions may be applied to the objects to be treated either plants or soil, for example, by spraying them in the form of dispersions produced by mixing wettable powders or miscible oils with water, or by dusting them in the form of dusts.

The production of a composition in accordance with the invention may be effected in manners known for such compositions. For this purpose, for example an active ingredient may be mixed with a pulverised inert carrier, such as chalk, dolomite, kaolin, pipe clay, attapulgite, or dissolved or dispersed in an inert solvent, such as toluene, xylene, aliphatic, alicyclic or aromatic ketones, for example acetone, methylethylketone or cyclohexanone, or mixtures thereof with hydrocarbons, if desired, with the addition of surface-active substances and dispersion agents. They may also be mixed with fertilizers. Hydrochloric acid binders may advantageously be added to the compositions.

A dust may be produced by mixing 5 parts by weight of an active ingredient with 95 parts by weight of kieselguhr and grinding the mixture.

A wettable powder may be produced by intimately mixing 20 parts by weight of an active ingredient with 5 parts by weight of oleylamidomethyltaurate, 10 parts by weight of calciumligninsulphonate and 75 parts by weight of chalk and grinding the resulting mixture.

Miscible oils containing from 5 to 30% and preferably from 10 to 20% of active ingredients and from 5 to 10% of ionogenic or non-ionogenic emulsifiers or mixtures thereof may be produced by dissolving these ingredients in organic solvents, for example, aliphatic or aromatic ketones, such as acetone and cyclohexanone, which may, if desired, be mixed with aromatic hydrocarbons such as toluene and xylene.

A dispersion may be produced by pouring into water a miscible oil which may be produced by mixing 25 parts by weight of active ingredient, 10 parts by weight of polyoxyethylene sorbitan fatty acid ester, 25 parts by weight of acetone and 30 parts by weight of methylethylketone.

What is claimed is:

1. The method of destroying undesired plant growth comprising contacting the undesired plant with a herbicidally effective amount of pentachloro-alkylamino-cyclotriphosphazatrienes of the formula

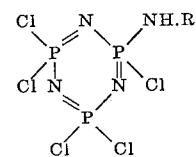

wherein R is an alkyl radical containing from 1–8 carbon atoms.

2. The method of destroying undesired plant growth comprising contacting the undesired plant with a herbicidally effective amount of the compounds of claim 1, wherein R is an alkyl of 1–4 carbon atoms.

3. The method of destroying undesired plant growth comprising contacting the undesired plant with a herbicidally effective amount of pentachloro-ethylamino-cyclotriphosphazatrienes.

4. The method of destroying undesired plant growth comprising contacting the undesired plant with a herbicidally effective amount of pentachloro-i-propylamino-cyclotriphosphazatrienes.

5. The method of destroying undesired plant growth comprising contacting the undesired plant with a herbicidally effective amount of pentachloro-n-butylamino-cyclotriphosphazatrienes.

References Cited

UNITED STATES PATENTS 3,197,464    7/1965    Ottmann et al. _____ 260—239

FOREIGN PATENTS 894,152    4/1962    Great Britain.

OTHER REFERENCES

Audrieth et al., Chemical Reviews, vol. 32, pages 118 to 120 and 126 to 130 (1943).

Ray et al., J. Chem. Soc., 1961, pp. 872–78.

LEWIS GOTTS, *Primary Examiner.*

JAMES O. THOMAS, Jr., *Examiner*